United States Patent [19]

Clavelloux et al.

[11] 4,308,749

[45] Jan. 5, 1982

[54] DEVICE FOR MEASURING IN REAL TIME SEA CURRENTS IN DEEP WATER

[75] Inventors: Noël Clavelloux; François Peynaud, both of Paris, France

[73] Assignee: Thomson-CSF, Paris, France

[21] Appl. No.: 151,588

[22] Filed: May 20, 1980

[30] Foreign Application Priority Data

May 23, 1979 [FR] France ............................... 79 13192

[51] Int. Cl.³ ............................................ G01D 21/00
[52] U.S. Cl. .................................................. 73/170 A
[58] Field of Search ................ 73/170 A, 189, 861.27, 73/861.29; 364/110, 420; 367/131

[56] References Cited

U.S. PATENT DOCUMENTS 4,104,912 8/1978 Clavelloux et al. ........... 73/170 A X
4,221,128 9/1980 Lawson et al. ................. 73/170 A X

*Primary Examiner*—Jerry W. Myracle

*Attorney, Agent, or Firm*—Oblon, Fisher, Spivak, McClelland & Maier

[57] ABSTRACT

A device for measuring in real time sea currents in deep water possibly exceeding 6000 m, as a function of the depth.

A spherical shaped plunger having negative floatability is dropped from a boat and descends to the bottom of the sea, releases its ballast and rises again to the surface where it is recovered.

Acoustic responding buoys positioned geographically as well as the contrivance receive pulses transmitted by the boat and respond to the boat. Furthermore, the contrivance also sends out a response intended for the buoys which reply to the boat; from the arrival times of these pulses, a computer on board the boat calculates the sequential positions of the contrivance in relation to the buoys as well as the velocities of the currents as a function of the depth.

9 Claims, 6 Drawing Figures

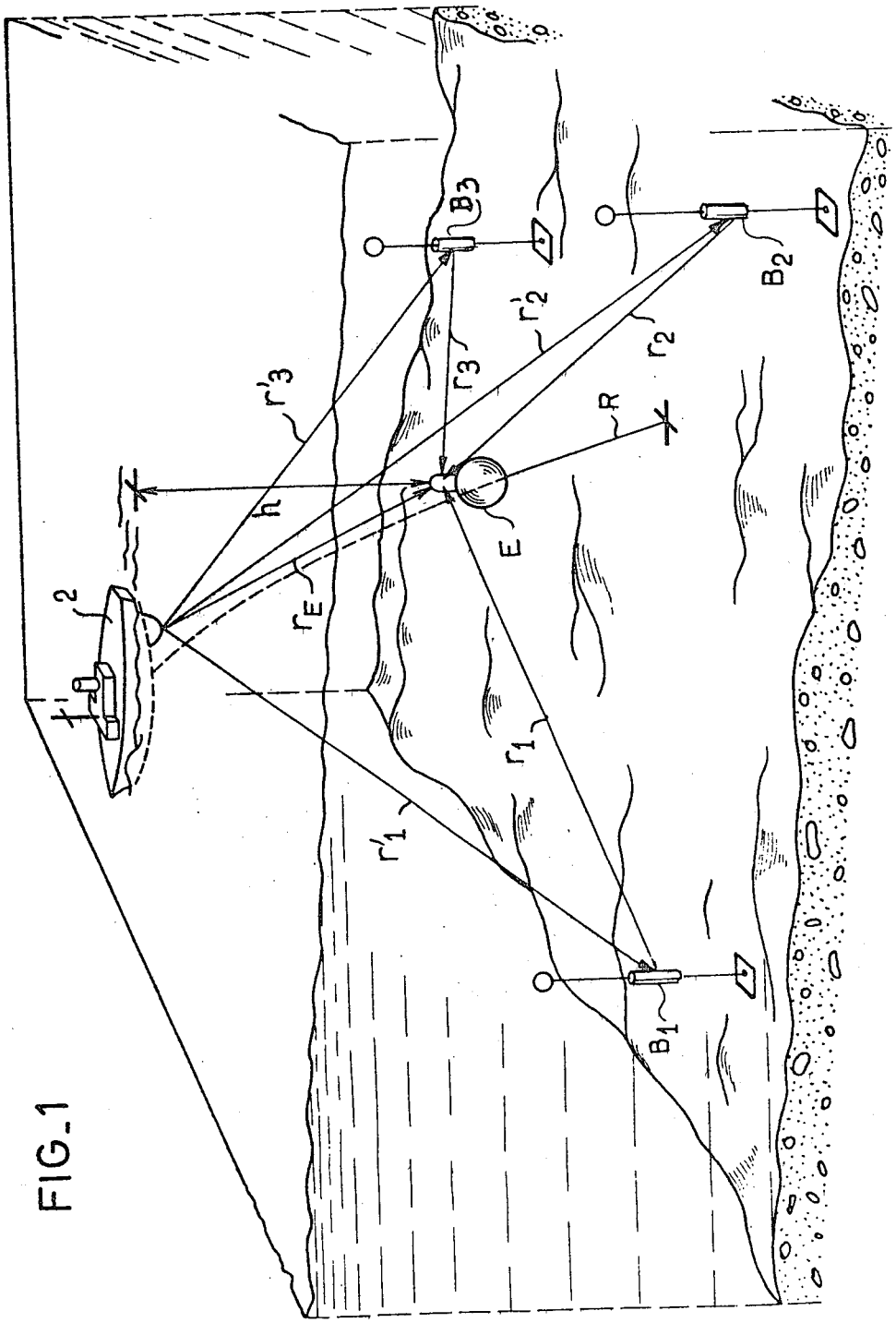
FIG_1

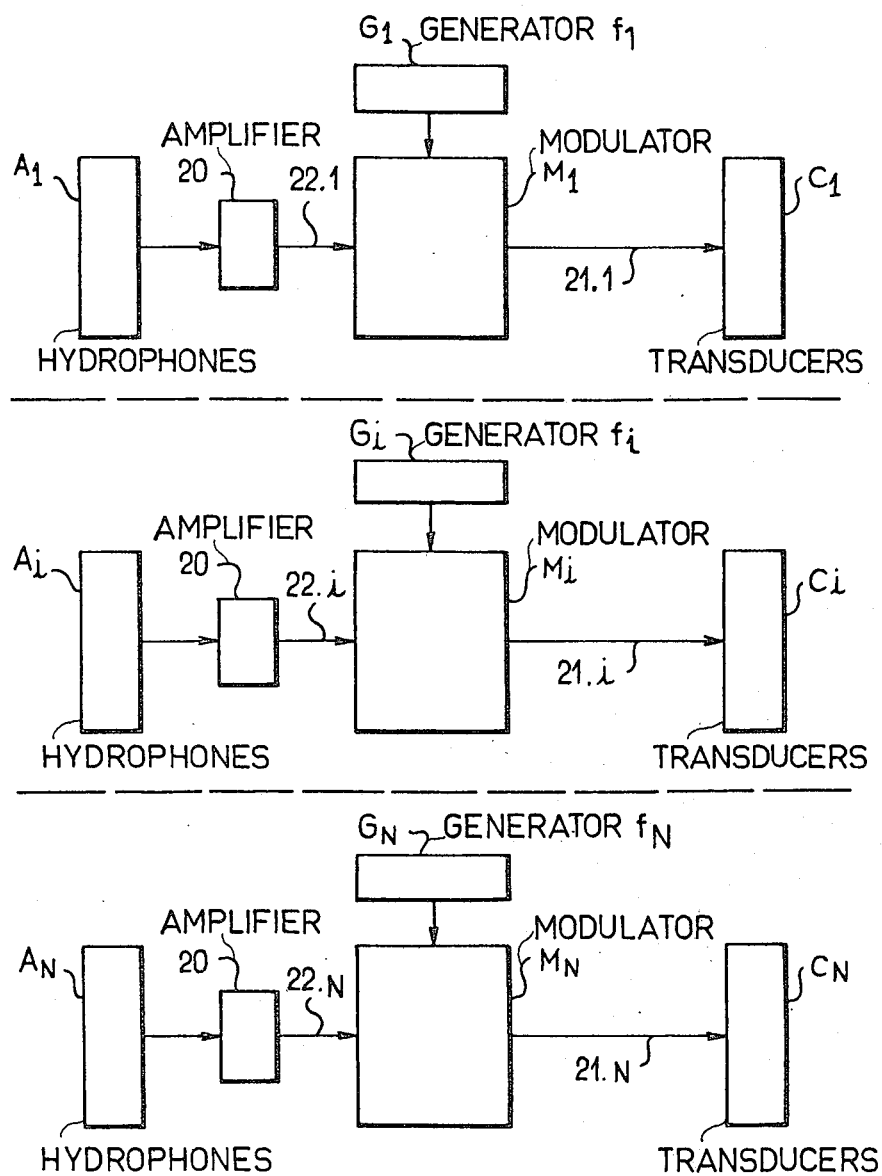
FIG_2

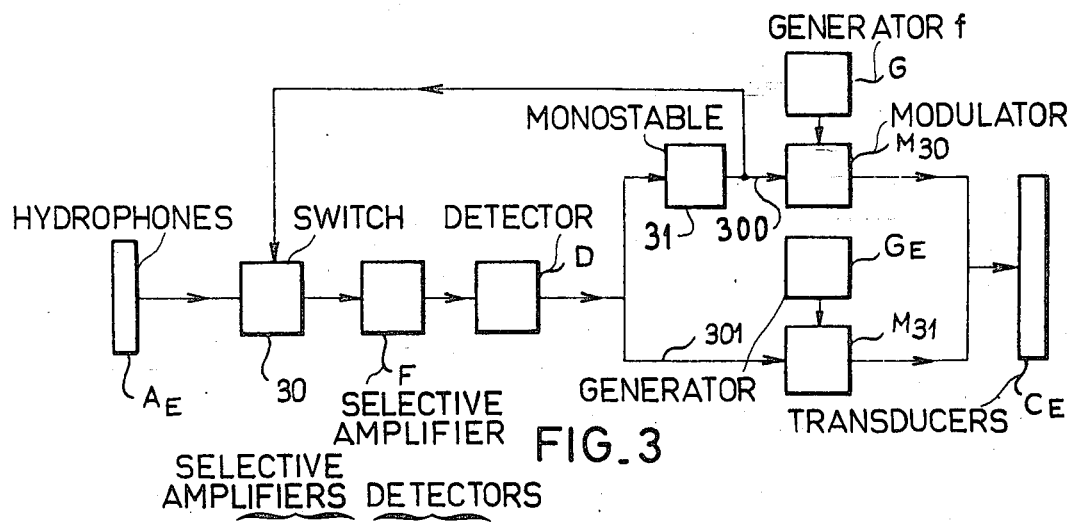
FIG_3
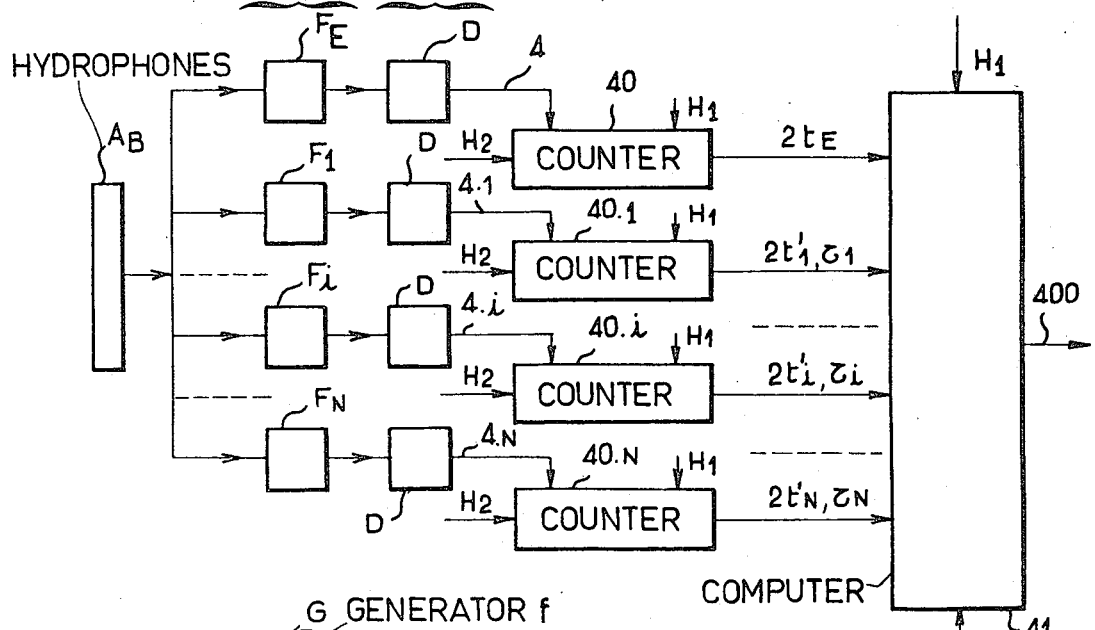
FIG_4a
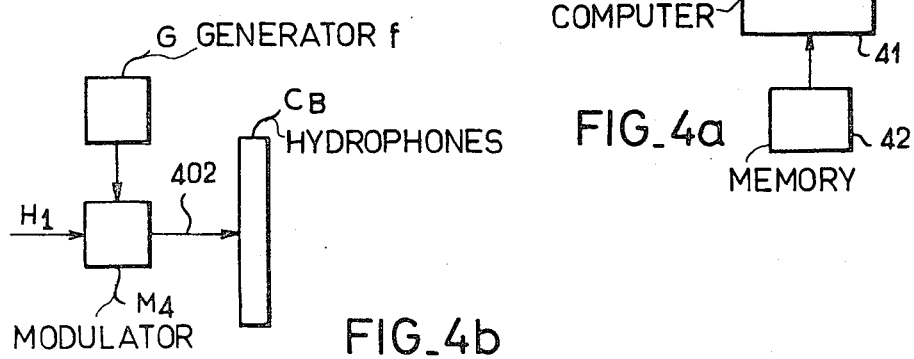
FIG_4b

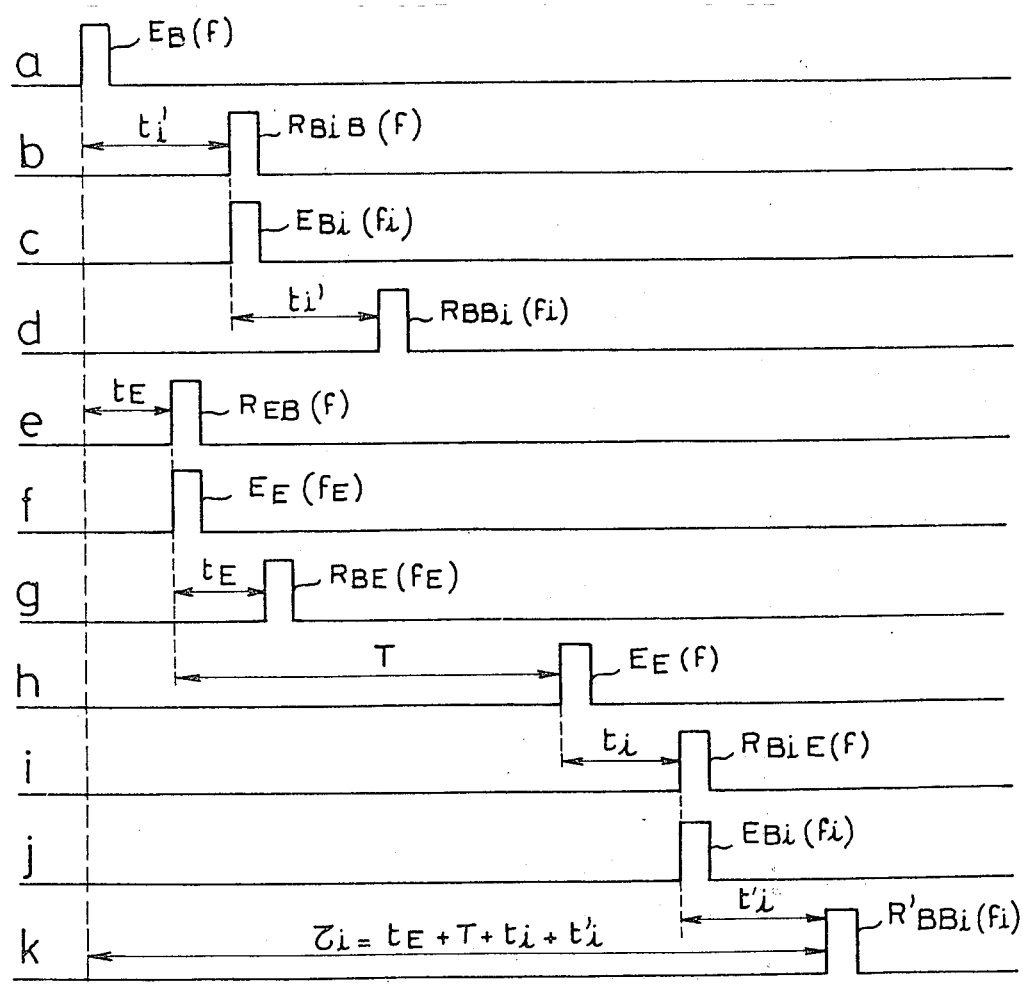
FIG_5

DEVICE FOR MEASURING IN REAL TIME SEA CURRENTS IN DEEP WATER

FIELD OF THE INVENTION

The present invention relates to a device for measuring in real time sea currents in deep waters.

BACKGROUND OF THE INVENTION

The knowledge of the currents in deep waters is important in the oil well drilling techniques out at sea, especially for calculating the stresses on the immersed structures. Further, if action by divers or submarines is required, it is important to know the speeds of the currents for safe working. Another application is the search for nodules.

It is known to measure the speed and the direction of the currents by means of a propeller current meter fixed to the sea-bed by means of an anchoring line.

The drawbacks of this device are that it only provides a pinpoint measurement, limited in accuracy because of the friction of the propeller and limited in depth because of the difficulty of providing too long an anchoring line.

It is known furthermore to measure the currents by means of a Doppler effect sonar. The signals used are obtained by volume reverberation of the acoustic waves. These devices supply the speeds of the currents in different depth ranges with good accuracy but have the drawback of not being able to be used in depths exceeding 1000 m because of the absorption of the acoutic waves and the divergence of the beam emitted by the sonar.

The device of the invention remedies these drawbacks by allowing currents to be measured in real time on board a boat for depths able to exceed 6000 m with slices of depth measurement of a thickness between 5 and 40 m and with an accuracy for the speed of the currents reaching 0.15 m/sec.

SUMMARY OF THE INVENTION

According to one of the features of the invention, the currents are measured by means of a spherical shaped body having negative floatability, i.e. denser than water, called plunger.

This plunger descends to the bottom of the sea and then rises again to the surface after releasing its ballast. The plunger contains acoustic transmitters and receivers communicating with the boat. Furthermore acoustic responding buoys are placed at the bottom of the sea and positioned geographically. These buoys respond to signals coming from the plunger and from the boat. The signals received on board the boat are used for calculating the positions of the plunger in relation to the buoys and for determining the currents at different depths.

It is a device for measuring in real time sea currents, or current meter, comprising a plunger dropped from a boat and descending to the bottom of the sea, drifting with the currents, wherein N acoustic responding buoys $B_1, B_2, \ldots B_i, \ldots B_N$ with $N \geq 3$ are lowered to the bottom of the sea and positioned geographically, the boat comprises means for transmitting acoustic pulses at the frequency f under the control of a clock $H_1$, the plunger comprises means for receiving these pulses at frequency f as well as means for transmitting a practically instantaneous response at frequency $f_E$ and a response delayed by time T at frequency f, the buoys $B_1, B_2, \ldots B_i, \ldots B_N$ responding to the pulses at frequency f by pulses at frequencies $f_1, f_2, \ldots f_i, \ldots f_N$, all these frequencies being different, the boat comprises means for receiving at frequencies $f_E, f_1, f_2, \ldots f_i, \ldots f_N$ and means for calculating, from the reception time of the different pulses, the coordinates of the plunger in relation to a system of coordinates tied to the responding buoys and a computer determines the currents as a function of the depth.

The above and other objects, features and advantages of the present invention will become apparent from the following description given solely by way of non limiting illustration, when taken in conjunction with the accompanying drawings.

DESCRIPTION OF THE DRAWINGS

FIG. 1 is a schematical view of the plunger descending to the bottom of the sea and its position in relation to the boat and the responding buoys.

FIG. 2 shows the transmitting and receiving devices of the responding buoys.

FIG. 3 shows the transmitting and receiving devices of the plunger.

FIGS. 4a and 4b show the transmitting, receiving and processing devices of the boat.

FIG. 5 shows the different timing diagrams.

DESCRIPTION OF THE PREFERRED EMBODIMENT

FIG. 1 shows a schematic view of the current measuring device of the invention.

A boat 2 has dropped a plunger E whose floatability is such that its descent speed has a predetermined value V. During its descent the float drifts under the effect of the currents following a path R.

N acoustic responding buoys $B_1, B_2, \ldots B_i, \ldots B_N$, where $N \geq 3$, are placed at the bottom of the sea, for the sake of simplification only buoys $B_1$, $B_2$ and $B_3$ are shown. Before dropping the plunger, the geographical positions of the buoys are determined by known methods.

We will call $r_1, \ldots r_i, \ldots r_N$ the distances from the plunger E to the buoys $B_1, \ldots B_i, \ldots B_N$, $r_1', \ldots r_i', \ldots r_N'$ will be the distances from the boat to these buoys. The boat-plunger distance will be $r_E$. The device of the invention enables the distances $r_1, \ldots r_i, \ldots r_N$ to be measured at the timing of a clock $H_1$ on board boat 2 and the successive positions of the plunger to be calculated in relation to a system of coordinates tied to the buoys. The values of the successive coordinates are used for calculating the currents at different depths. The receiving/transmitting devices mounted in all the buoys are shown schematically in FIG. 2. Each of the buoys such as $B_i$ comprises receiving hydrophones $A_i$, which pick up the pulses at frequency f coming from the plunger. The signals are amplified selectively about a frequency f by circuit 20. The detected pulses control a modulator such as $M_i$ connected to a generator $G_i$ at frequency $f_i$. The response pulses are fed to transducers $C_i$. Thus, all the buoys $B_1, \ldots B_i, \ldots B_N$ respond to the pulses from the plunger or from the boat at frequency f by pulses at frequencies $f_1, \ldots f_i, \ldots f_N$, all these frequencies being different.

FIG. 3 shows the transmitting and receiving devices of the plunger. The receiving hydrophones $A_E$ pick up the pulses at frequency f coming from the boat. The electrical signals generated passing through a switch 30 are selectively amplified about frequency f at F and detected by circuit D. The signals detected at output 301 are fed to a modulator $M_{31}$ which is connected to a generator $G_E$ at frequency $f_E$. The pulses in response to this frequency $f_E$ are fed to transmitting transducers $C_E$. The plunger may also respond by pulses to the frequency f, emitted by the transductors $C_E$.

The pulse detected at 301 is also fed to a circuit 31, a monostable for example, which delays the pulse by a time T. The delayed pulse controls a modulator 30 connected to a generator G at frequency f, producing the pulse in response to this frequency f. To avoid interferences between transmission and reception at this frequency f, the delayed pulse is also fed through 31 to open switch 30 during the time of this response.

FIG. 4b shows the transmitting device on board the boat. A modulator $M_4$ controlled by clock $H_1$ which gives the recursion of the interrogations is connected to a generator G at frequency f, supplying pulses at this frequency at 402 which are applied to transmitting transductors $C_B$.

FIG. 4a shows the receiving and processing device on board the boat. The hydrophones $A_B$ receive pulses from the plunger and from the buoys. The electric signals are selectively amplified at $F_E$ and detected by circuit D at 4 and applied to a counter 40. This latter is triggered at the same time as the clock $H_1$ emits a reception signal at 4. The number of these pulses is then proportional to the time elapsing from the interrogation to the arrival and which counts the pulses of a clock $H_2$.

The signals supplied by transducers $A_B$ are also applied to selective amplifiers $F_1, \ldots F_i, \ldots F_N$ centered about frequencies $f_1 \ldots f_i \ldots f_N$. The filtered signals are detected by circuits D and applied to counters $40.1 \ldots 40.i \ldots 40.N$.

All the counters are also triggered by clock $H_1$ and count the different numbers of pulses of clock $H_2$ intervening up to the arrival of the different signals $f_i$. The count results of all the counters are transmitted to a computer 41.

The principle of calculating the plunger-buoy distances will be better understood from the timing diagrams of FIG. 5.

On line a there is shown the positive envelope of the signal $E_B(f)$ transmitted by the boat at frequency f. The signals are triggered by clock $H_1$ and are to be found at 402 in FIG. 4b.

On line b, there is shown the detected signal received by the buoy $B_i$, $R_{BiB}(f)$ at 22.i (FIG. 2).

On line c is shown the positive envelope of the signal transmitted by buoy $B_i$, $E_{Bi}(f_i)$ at frequency $f_i$ at 21.1 in FIG. 2. The signal transmitted by this buoy and received by the hydrophone of the boat at 4.i (FIG. 4a) is shown on line d at $R_{BB_i}(f)$.

On line e has been shown the signal $R_{EB}(f)$, received by the plunger at 300 (FIG. 3) and on line f the positive envelope of the signal transmitted by the plunger, $E_E(f_E)$ at frequency $f_E$ to transductors $C_E$ (FIG. 3).

On line g is shown the signal received on the boat coming from the plunger $R_{BE}(f_E)$ at 4 (FIG. 4b).

On line h is shown the positive envelope of the signal transmitted by the plunger at frequency f, $E_E(f)$ to the transductors $C_E$ (FIG. 3).

On line i is shown the signal $R_{BiB}(f)$ received by buoy $B_i$ from the plunger at 22.i (FIG. 2) and on line j the positive envelope of the response signal from the buoy $E_{Bi}(f_i)$ at 21.i (FIG. 2).

Finally on line k is shown the second signal received by the boat from buoy $B_i$, $R'_{BBi}(f_i)$.

The signals $R_{BE}(f_E)$, $R_{BBi}(f_i)$ and $R'_{BBi}(f_i)$ are received at times $2t_E$, $2t'_i$ and $\tau_i$, with $t'_i = r'_i/C$ and $t_E = r/C$, $t_E$ and $r'_i$ being the distances from the boat to the plunger and to buoy $B_i$ and C the velocity in the propagation medium.

Finally, $t_i$ and $r_i$ are calculated in circuit 41 from relationships $$t_i = \tau_i - T - t_i - t_E \text{ and } r_i = Ct_i$$

Known delay time T supplied by circuit 31 (FIG. 3) which delays the second interrogation of the buoys so as not to disturb the receiving circuits of the buoys or those of the boat, is reproduced by computer 41 from memory 46.

A fixed coordinate system is defined, Oxy tied to the buoys, where Oz is the direction of the vertical. From values $r_1, \ldots r_2, \ldots r_N$ computer 41 determines the values at time t of the coordinates of the plunger x(t), y(t) and z(t).

The accuracy of the values of the coordinates is improved by using more than 3 responding buoys.

In a preferred embodiment, N=4 and the plunger stores the values $r_1(t)$, $r_2(t)$, $r_3(t)$ and $r_4(t)$ which are supplied to computer 41. From values $r_1(t)$, $r_2(t)$ and $r_3(t)$ are calculated the positions $x^{(1)}(t)$, $y^{(1)}(t)$ and $z^{(1)}(t)$.

The computer determines further from values $r_1(t)$, $r_3(t)$, and $r_4(t)$ the positions $x^{(2)}(t)$, $y^{(2)}(t)$ and $z^{(2)}(t)$ and finally from values $r_2(t)$, $r_3(t)$ and $r_4(t)$ it calculates the positions $x^{(3)}(t)$, $y^{(3)}(t)$ and $z^{(3)}(t)$.

The successive values of x(t), y(t) and z(t) are calculated by known smoothing methods.

From these coordinates computer 41 determines the values of the components of the speeds of the current in a horizontal plane at time $$t : \frac{dx}{dt} \text{ and } \frac{dy}{dt}.$$

In a preferred embodiment, for calculating these drifts, the so-called Rutledge method described in the book entitled: "The Mathematics of Physics and Chemistry" by H. Margenau and G. M. Murphy Van Nostrand Company, (1961) is used.

This method of Rutledge uses the successive values of a coordinate such as $x_{n-2}$, $x_{n-1}$, $x_{n+1}$ and $x_{n+2}$ sampled at time intervals $T_1$ to calculate $$\frac{dx}{dt}$$

for $x = x_n$ by the formula:

$$\left(\frac{dx}{dt}\right) x = x_n = \frac{1}{12T_1} [(x_{n-2} - x_{n+2}) - 8(x_{n-1} - x_{n+1})]$$

The velocity components of the current found as a function of time are finally supplied at the output of computer 41 as a function of depth h.

In a preferred embodiment, the plunger arriving at the bottom of the sea touches the bottom and after releasing its ballast rises again to the surface where it may be recovered by the boat. The calculations of the coordinates and of the currents continue during the ascent and computer 41 calculates new values and currents.

However, this ascent may also take place after a predetermined time by means of a clockwork mechanism, or even preferably when a predetermined immersion is reached or when a preset pressure gauge mechanically sets off the release of the ballast.

In one embodiment, taking:
depth of the sea 6000 m
size of the field of the buoys 8000×8000 m
speed of descent of the plunger 0.25 m/sec
thickness of the slice of water for measurement 25 m
accuracy on the velocity of the currents 0.15 m/sec
frequency of interrogation $f = 16$ kHz
frequency of response $f_1$ or $f_E =$ between 9 and 12 kHz The information about the currents at 400 is obtained substantially in real time and may be used directly.

It is apparent that within the scope of the invention, modifications and different arrangements can be made other than are here disclosed. The present disclosure is merely illustrative with the invention comprehending all variations thereof.

What is claimed is:

1. A device for measuring in real time sea currents, or current meter, comprising a plunger dropped from a boat and descending to the bottom of the sea, drifting with the currents, wherein N acoustic responding buoys $B_1, B_2, \ldots B_i, \ldots B_N$ with $N \geq 3$ are lowered to the bottom of the sea and positioned geographically, the boat comprises means for transmitting acoustic pulses at frequency f under the control of a clock $H_1$, the plunger comprises means for receiving these pulses at frequency f as well as means for transmitting a practically instantaneous response at frequency $f_E$ and a response delayed by time T at frequency f, buoys $B_1, B_2, \ldots B_i, \ldots B_N$ responding to the pulses at frequency f by pulses at frequencies $f_1, f_2, \ldots f_i, \ldots f_N$, all these frequencies being different, the boat comprising means for receiving at frequencies $f_E, f_1, f_2, \ldots f_i, \ldots f_N$ and a computer for calculating from the time of reception of the different pulses, the coordinates of the plunger in relation to a system of coordinates tied to the responding buoys and wherein said computer determines the currents as a function of the depth.

2. The current meter as claimed in claim 1, wherein the receiving means of the boat comprise hydrophones $A_B$ which supply electric signals applied to selective amplifiers $F_E, F_1, \ldots F_i, \ldots F_N$ centered on frequencies $f_e, f_1, \ldots f_i, \ldots f_N$, these filtered signals are detected and applied to counters 40, 40.1, ... 40.i, ... 40.N, all these counters being triggered by clock $H_1$ and stopped by the signals received, the values supplied by these counters being applied to the computer, said computer receiving the values of the positions of the responding buoys, as well as the value of the delay time of the transmission of the plunger at frequency f and wherein the computer determines the values of the plunger-buoy distances $r_1, \ldots r_i, \ldots r_N$.

3. The current meter as claimed in claim 1, wherein the computer of the boat receives, on the one hand, the values of the geographical coordinates of buoys $B_1, B_2, \ldots B_i, \ldots B_N$ and, on the other hand, the values of the responding buoy-plunger distances as a function of time t, $r_1(t), r_2(t), \ldots r_i(t), \ldots r_N(t)$ and wherein the computer determines the values x(t), y(t) and z(t) of the successive coordinates of the plunger in relation to a system of coordinates tied to the buoys.

4. The current meter as claimed in claim 3, wherein the number of buoys N=4, the computer receives the values $r_1(t), r_2(t), r_3(t)$ and $r_4(t)$, and from values $r_1(t), r_2(t)$ and $r_3(t)$ it calculates the values $x^{(1)}(t), y^{(1)}(t)$ and $z^{(1)}(t)$, from values $r_1(t), r_3(t)$ and $r_4(t)$ it calculates values $x^{(2)}(t), y^{(2)}(t)$ and $z^{(2)}(t)$ and from values $r_2(t), r_3(t)$ and $r_4(t)$ it calculates values $x^{(3)}(t), y^{(3)}(t)$; and $z^{(3)}(t)$ and wherein a smoothing method enables the values of x(t) to be obtained from the successive values of $x^{(1)}(t), x^{(2)}(t)$ and $x^{(3)}(t)$, the values of y(t) to be obtained from the successive values of $y^{(1)}(t), y^{(2)}(t)$ and $y^{(3)}(t)$ and values of z(t) to be obtained from the successive values of $z^{(1)}(t), z^{(2)}(t)$ and $z^{(3)}(t)$.

5. The current meter as claimed in claim 3, wherein, for calculating the values of x(t), y(t) and z(t), the values $r_1(t), r_2(t)$ and $r_3(t)$ during the ascent and the descent of the plunger are used.

6. The current meter as claimed in claim 3, wherein the computer supplies to a display device the values of the horizontal velocities of the current $$\frac{dx}{dt} \text{ and } \frac{dy}{dt}$$

as a function of the depth.

7. The current meter as claimed in claim 1, wherein the plunger comprises a ballast release device set off by the contact of the plunger with the sea bed, which causes the plunger to rise again to the surface.

8. The current meter as claimed in claim 1, wherein the plunger comprises a ballast release device set off by a manometric device, preset to a predetermined immersion and which causes the plunger to rise again to the surface.

9. The current meter as claimed in claim 1, wherein the plunger comprises a ballast release device set off by a clockwork device preset to a given time and which causes the plunger to rise to the surface again.

* * * * *